(12) United States Patent
Tople et al.

(10) Patent No.: US 8,795,872 B2
(45) Date of Patent: Aug. 5, 2014

(54) BATTERY CELL SYSTEM WITH INTERCONNECTED FRAMES

(75) Inventors: Tom Tople, Indianapolis, IN (US); Ed Cates, Anderson, IN (US); Len Wolf, Indianapolis, IN (US); Bruce Silk, Indianapolis, IN (US)

(73) Assignee: Enerdel, Inc., Greenfield, IN (US)

( * ) Notice: Subject to any disclaimer, the term of this patent is extended or adjusted under 35 U.S.C. 154(b) by 156 days.

(21) Appl. No.: 12/843,667

(22) Filed: Jul. 26, 2010

(65) Prior Publication Data
US 2012/0021271 A1    Jan. 26, 2012

(51) Int. Cl.
*H01M 10/0585*    (2010.01)

(52) U.S. Cl.
USPC .............................. 429/151; 429/162; 429/99

(58) Field of Classification Search
CPC ..................... H01M 10/0481; H01M 10/0468; H01M 8/248
USPC .................................... 429/96–100, 151, 162
See application file for complete search history.

(56) References Cited

U.S. PATENT DOCUMENTS

| | | | |
|---|---|---|---|
| 4,678,724 A | 7/1987 | McElroy | |
| 4,826,741 A | 5/1989 | Aldhar et al. | |
| 5,071,652 A | 12/1991 | Jones et al. | |
| 5,354,630 A | 10/1994 | Earl et al. | |
| 6,117,584 A | 9/2000 | Hoffman et al. | |
| 6,709,783 B2 | 3/2004 | Ogata et al. | |
| 6,821,671 B2 | 11/2004 | Hinton et al. | |
| 7,226,680 B2 | 6/2007 | Wexel et al. | |
| 7,531,270 B2 | 5/2009 | Buck et al. | |
| 8,263,252 B2 | 9/2012 | Yun et al. | |
| 2002/0022164 A1 | 2/2002 | Keppeler | |
| 2004/0016455 A1 | 1/2004 | Oogami | |
| 2004/0023090 A1* | 2/2004 | Pearson et al. | 429/30 |
| 2004/0050414 A1 | 3/2004 | Oogami | |
| 2005/0008911 A1 | 1/2005 | Kaye | |

(Continued)

FOREIGN PATENT DOCUMENTS

| | | |
|---|---|---|
| JP | 2001229897 | 8/2001 |
| JP | 2005116437 | 4/2005 |

(Continued)

OTHER PUBLICATIONS

International Search Report in PCT/US2011/044204, May, 2102, 3 pgs.

(Continued)

*Primary Examiner* — Raymond Alejandro
*Assistant Examiner* — Helen McDermott

(57) ABSTRACT

A battery cell assembly includes a plurality of sub-assemblies. Each sub-assembly includes a heat sink and a first frame and a second frame disposed on opposite sides of the heat sink. The sub-assemblies are stacked to form a plurality of cell pockets that receive a battery cell. The battery cell assembly further includes a plurality of tie rods for fixing the plurality of sub-assemblies together. The first frame is formed with a plurality of through holes, and the second frame is formed with a plurality of protrusions with a hole extending therethrough. The frames are brought together such that each protrusion is at least partially received in a respective through hole. The interior surfaces of corresponding protrusions and through holes of the stack of frames form a passage for one of the tie rods to extend through.

30 Claims, 5 Drawing Sheets

(56) References Cited

U.S. PATENT DOCUMENTS

| | | | |
|---|---|---|---|
| 2005/0106443 A1 | 5/2005 | Adams et al. | |
| 2006/0147773 A1 | 7/2006 | Steinshnider et al. | |
| 2006/0154125 A1 | 7/2006 | Na et al. | |
| 2006/0234119 A1* | 10/2006 | Kruger et al. | 429/160 |
| 2006/0240300 A1 | 10/2006 | Thompson et al. | |
| 2007/0009775 A1 | 1/2007 | Lee | |
| 2007/0117005 A1 | 5/2007 | Fuglevand et al. | |
| 2008/0090137 A1* | 4/2008 | Buck et al. | 429/120 |
| 2008/0193830 A1 | 8/2008 | Buck et al. | |
| 2008/0280178 A1 | 11/2008 | Spink et al. | |
| 2009/0004519 A1 | 1/2009 | Vitella et al. | |
| 2009/0123294 A1 | 5/2009 | Dong et al. | |
| 2009/0181269 A1 | 7/2009 | Unoki et al. | |
| 2009/0186265 A1 | 7/2009 | Koetting et al. | |
| 2010/0086842 A1 | 4/2010 | Yang | |
| 2012/0196174 A1 | 8/2012 | Mikus et al. | |

FOREIGN PATENT DOCUMENTS

| | | |
|---|---|---|
| JP | 2006-66322 | 3/2006 |
| JP | 2008140611 | 6/2008 |
| JP | 2009146797 | 7/2009 |
| KR | 2009 0043429 | 5/2009 |
| WO | WO 2009/061451 | 5/2009 |
| WO | WO 2009/073225 | 6/2009 |
| WO | WO 2010/081704 | 7/2010 |
| WO | WO 2010/099906 | 9/2010 |
| WO | WO 2011/057246 | 5/2011 |

OTHER PUBLICATIONS

Dictionary Listing for "tortuous", Merriam-Webster Online, printed May 7, 2013, 2 pages.

Dictionary Listing for "accessible", Merriam-Webster Online, printed May 7, 2013, 3 pages.

Extended European Search Report for Application No. 11814986.3, mailed Mar. 27, 2014, 14 pages.

* cited by examiner

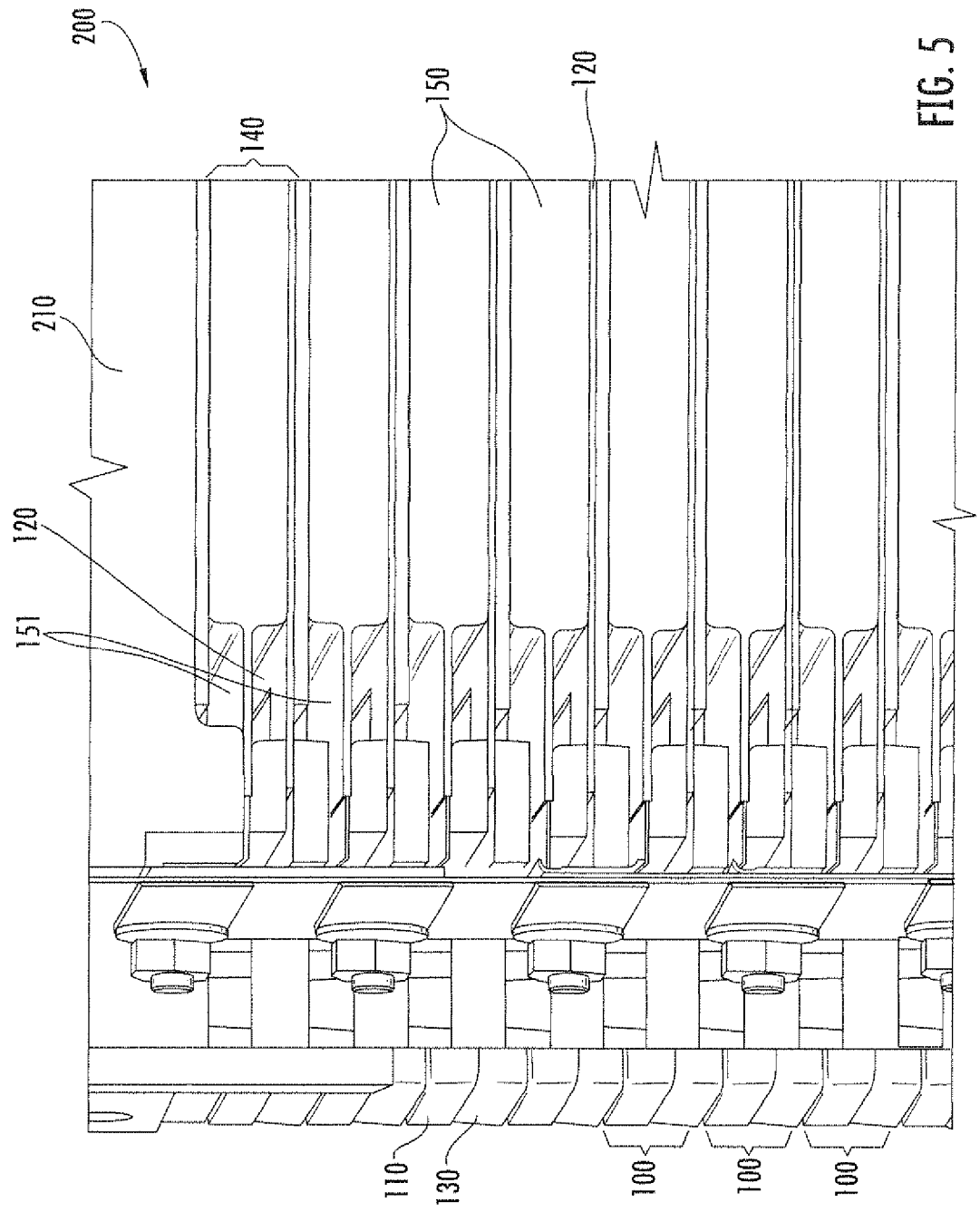

BATTERY CELL SYSTEM WITH INTERCONNECTED FRAMES

FIELD

Embodiments relate in general to batteries and, more particularly, to multi-cell battery systems.

BACKGROUND

A battery is a device that converts chemical energy directly to electrical energy. In some applications, multiple battery cells, such as lithium battery cells, are assembled together to form a battery cell assembly so as to provide sufficient power for various applications. In order to assemble a plurality of battery cells, the cells are arranged in a stack along with generally planar frames. Portions of the battery cells are sandwiched between the battery frames. Tie rods can be used to hold the stack of battery cells together under slight compression. Each tie rod can extend through a passage collectively formed by aligned holes in the frames. Each tie rod can be fixed in place by, for example, a threaded nut, at each end of the tie rod.

However, this type of assembly does not provide sufficient stability and rigidity to the stack. For example, while the tie rods may fix the frames relative to each other in one direction (in the axial direction of the tie rod), they may move relative to one another in one or more directions transverse to the axial direction of the tie rod. This lack of stability and rigidity can preclude the suitability of this type of assembly to stacks having a large number of cells. Moreover, this type of assembly does not sufficiently isolate the tie rods from the battery cells. Indeed, in some instances, it may be possible for the tie rods and the battery cells to come into contact with each other, such as when the battery cells are oversized or not properly aligned in the stack. In such cases, the battery cell and the tie rod may contact each other in the spaces between adjacent frame members where portions of the battery cell are sandwiched. Consequently, a short can develop, which can adversely affect battery performance, shorten the battery life span and endanger people who may handle the battery.

Therefore, there is a need for a system that can minimize such concerns.

SUMMARY

In a first respect, embodiments are directed to battery assembly. The assembly includes a plurality of sub-assemblies. Each sub-assembly includes a cell support, a first frame and a second frame. The cell support can be a heat sink.

The first frame has an upper side and a lower side. A plurality of holes extends through the first frame from the upper side to the lower side. The second frame has an upper side and a lower side. A plurality of protrusions extends from the upper side thereof to an outer tip surface. The protrusions can have any suitable cross-sectional shape. In one embodiment, one or more of the protrusions can have a substantially circular cross-sectional shape. A plurality of holes extends through the second frame from the lower side to a respective one of the outer tip surfaces.

The first and second frames are disposed on opposite sides of the cell support. At least a portion of the heat sink is sandwiched between the lower side of the first frame and the upper side of the second frame. Each of the protrusions is at least partially received in a respective one of the holes in the first frame. As a result, the first and second frames are interlockingly engaged.

The plurality of sub-assemblies is stacked to form a plurality of cell pockets. Each cell pocket is formed between two adjacent sub-assemblies. The holes in the second frame of each of the sub-assemblies are substantially aligned so as to collectively form a plurality of passages. Such passages can receive an elongated fastener so as to fix the plurality of sub-assemblies together.

The assembly can further include a plurality of battery cells. Each battery cell can be received in a respective one of the plurality of cell pockets. Portions of each battery cell can be sandwiched between adjacent sub-assemblies. In one embodiment, the battery cells can be lithium-ion battery cells.

The assembly can also include two end plates. The end plates can be disposed on opposite ends of the plurality of sub-assemblies. Thus, the plurality of sub-assemblies can be sandwiched between the two end plates.

The first and second frames can have a substantially rectangular shape and an open middle portion. The frames can have a plurality of corner regions. Each hole in the first frame can be located in a corner region of the first frame. Each protrusion of the second frame can be located in a corner region of the second frame. Each of the first frames can include a protrusion. The protrusion can be received into a hole in the second frame of an adjacent one of the plurality of sub-assemblies. The protrusion can extend from the upper side of each of the first frames to an outer tip surface. A hole extends through the first frame from the lower side to the outer tip surface. The protrusion can be located in one of the corner regions of the first frame proximate to one of the holes.

Each protrusion can have an associated height. The height of each protrusion can be less than or equal to the depth of a corresponding through hole into which the protrusion is received.

In a first one of the sub-assemblies, the height of at least one of the protrusions of the second frame can be greater than the depth of a corresponding through hole into which the protrusion is received. In such case, the protrusion can extend beyond the upper side of the first frame and into a recess provided in the lower side of the second frame of an adjacent second one of the sub-assemblies.

The assembly can include a plurality of elongated fasteners. Each elongated fastener can be received in a respective one of the passages. The plurality of elongated fasteners can fix the plurality of sub-assemblies together. In one embodiment, the elongated fasteners can be tie rods.

In another respect, embodiments are directed to a battery assembly. The assembly includes a plurality of sub-assemblies. Each of the sub-assemblies includes a cell support, a first frame and a second frame.

The first frame has an upper side and a lower side. A plurality of holes extends through the first frame from the upper side to the lower side. The second frame has an upper side and a lower side. A plurality of protrusions extends from the upper side thereof to an outer tip surface. A plurality of holes extends through the second frame from the lower side to a respective one of the outer tip surfaces. The cell support can be a heat sink.

The first and second frames are disposed on opposite sides of the cell support. As a result, at least a portion of the cell support is sandwiched between the lower side of the first frame and the upper side of the second frame. In addition, each of the protrusions is at least partially received in a respective one of the holes in the first frame. In this way, the first and second frames are interlockingly engaged.

The plurality of sub-assemblies is stacked to form a plurality of cell pockets. Each cell pocket is formed between two adjacent sub-assemblies. The holes in the second frame of each of the sub-assemblies are substantially aligned so as to collectively form a plurality of passages.

The assembly also includes a plurality of battery cells. Each battery cell is received in a respective one of the plurality of cell pockets. Portions of each battery cell are sandwiched between adjacent sub-assemblies.

The assembly includes a plurality of elongated fasteners. In one embodiment, the elongated fasteners can be tie rods. Each elongated fastener is received in a respective one of the passages. As a result, the plurality of elongated fasteners fixes the plurality of sub-assemblies together.

In still another respect, embodiments are directed to a battery assembly. The battery assembly includes a plurality of sub-assemblies. Each sub-assembly includes a first frame and a second frame.

The first frame has an upper side and a lower side. A plurality of holes extends through the first frame from the upper side to the lower side. The second frame has an upper side and a lower side. A plurality of protrusions extends from the upper side thereof to an outer tip surface. A plurality of holes extends through the second frame from the lower side to a respective one of the outer tip surfaces. Each of the protrusions is at least partially received in a respective one of the holes in the first frame.

The assembly includes a plurality of battery cells. The plurality of sub-assemblies is alternatingly stacked with the plurality of battery cells such that portions of each battery cell are sandwiched between adjacent sub-assemblies. The holes in the second frame of each of the sub-assemblies are substantially aligned so as to collectively form a plurality of passages.

The assembly includes a plurality of elongated fasteners, which can be, for example, tie rods. Each elongated fastener can be received in a respective one of the passages. The plurality of elongated fasteners fixes the plurality of sub-assemblies together.

In a first one of the sub-assemblies, the height of one or more of the protrusions of the second frame can be greater than the depth of a corresponding through hole in the first frame into which the protrusion is received. As a result, the one or more protrusions can extend beyond the upper side of the first frame and into a recess provided in the lower side of the second frame of an adjacent second one of the sub-assemblies.

Each protrusion can have an associated height. In one embodiment, the height of each protrusion can be less than or equal to the depth of a corresponding through hole into which the protrusion is received.

BRIEF DESCRIPTION OF THE DRAWINGS

FIG. 5 is perspective partial cross-sectional view of the battery cell assembly, showing battery cells being received in respective cell pockets.

DETAILED DESCRIPTION

Figure 1:
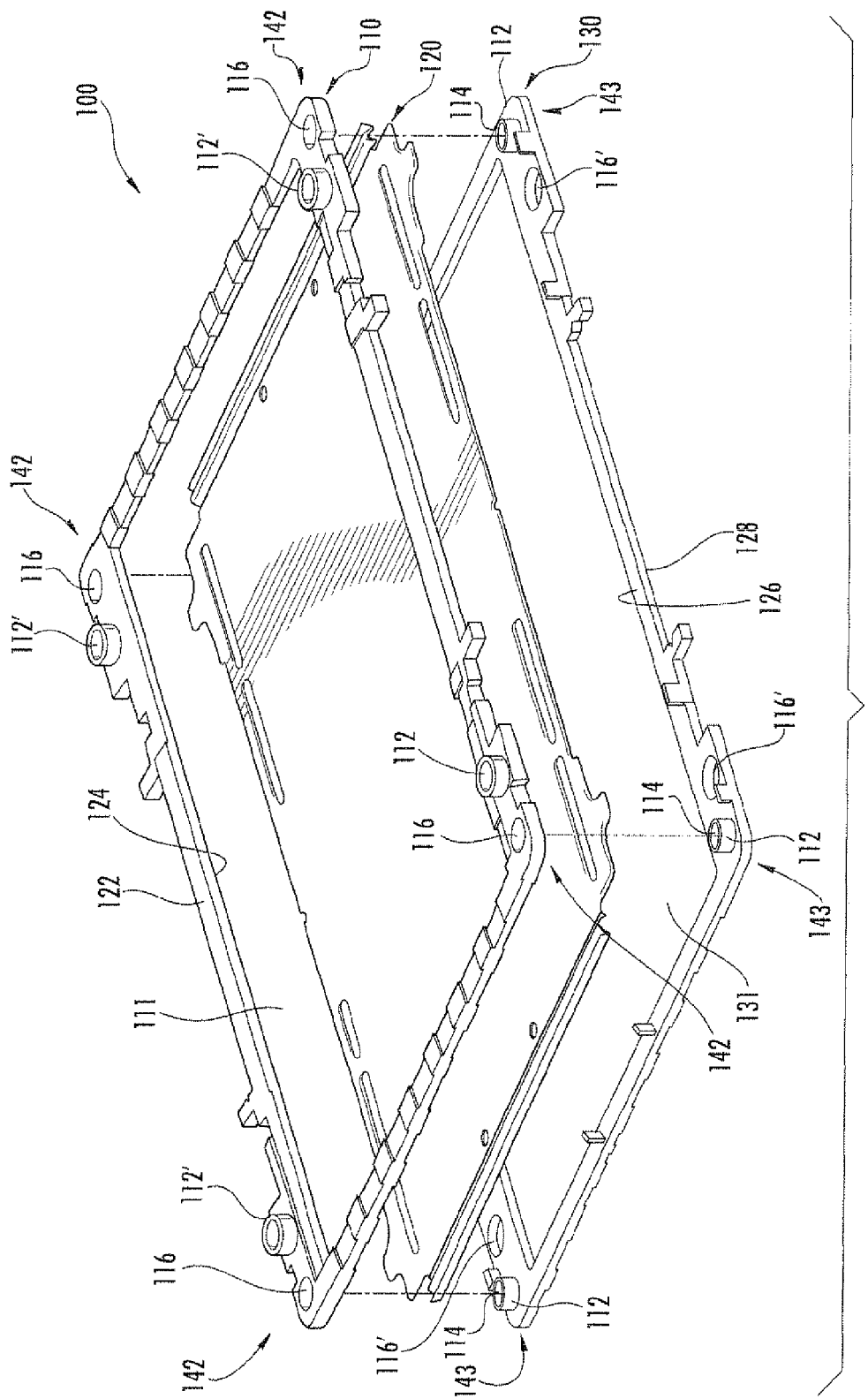
FIG. 1 is an exploded perspective view of a sub-assembly.

Embodiments are directed to a battery assembly with interlocking features. Aspects will be explained in connection with one possible system and method, but the detailed description is intended only as exemplary. Embodiments are shown in FIGS. 1-5, but the embodiments are not limited to the illustrated structure or application. It will be appreciated that for simplicity and clarity of illustration, where appropriate, reference numerals have been repeated among the different figures to indicate like elements.

A battery assembly can comprise a plurality of sub-assemblies. Referring to FIG. 1, an exploded view of an example of a sub-assembly 100 is shown. In one arrangement, the sub-assembly 100 can include a cell support, a first frame 110 and a second frame 130. The first and second frames 110, 130 are disposed on opposite sides of the cell support. In one embodiment, the cell support can be a heat sink 120, which can dissipate heat generated by the battery cells so as to prevent degradation of the battery cells due to overheating. The heat sink 120 can be made of any suitable heat dissipating material, including, for example, copper or aluminum. The heat sink 120 can have any suitable conformation. In one embodiment, the heat sink 120 can be generally rectangular. However, other conformations are possible, depending on the particular application at hand. The heat sink 120 can be a generally flat, planar structure. The heat sink 120 can have various other features, such as holes, slots and projections, as may be needed.

The first and second frames 110, 130 can be made of any suitable material. For instance, the first and second frames 110, 130 can be made of plastic. The first and second frames 110, 130 can have any suitable conformation. In one embodiment, the first and second frames 110, 130 can be generally rectangular. However, other conformations are possible, depending on the particular application at hand. The first and second frames 110, 130 can have generally the same conformation as the heat sink 120. The first and second frames 110, 130 can have an open middle portion 111, 131, respectively.

The first and second frames 110, 130 can be substantially identical to each other, except for certain structures described herein. The first frame 110 can have an upper side 122 and a lower side 124. The second frame 130 can have an upper side 126 and a lower side 128. The terms "upper" and "lower" are used for convenience to facilitate the discussion and are used to denote their relative orientation in FIG. 2; however, it will be understood that the use of these terms is not intended to be limiting, as the first and second frames 110, 130 and their associated sides 122, 124, 126, 128 can have any suitable orientation when assembled and in use.

The first and second frames 110, 130 can include features to allow for a greater degree of engagement between them, besides the mere abutment of the lower surface 124 of the first frame 110 and the upper surface 126 of the second frame 130. For instance, as shown in FIG. 1, the first frame 110 can include a plurality of holes 116 extending through the thickness of the first frames 110 from the upper side 122 to the lower side 124. The holes 116 can have any suitable conformation. In one embodiment, the holes 116 can be substantially circular in cross-sectional shape, but other cross-sectional shapes are possible, including, for example, substantially rectangular, oval, triangular, polygonal and trapezoidal. The plurality of holes 116 can be substantially identical to each other, or at least one of the holes 116 can be different from the other holes 16 in at least one respect including any of those described above.

There can be any suitable quantity of holes 116. In one embodiment, there can be four holes 116. However, there may be greater or fewer holes 116. The holes 116 can be arranged in any suitable manner. For example, there can be at least one hole 116 in each corner region 142 of the first frame 110. The corner region 142 includes the area where two portions of the first frame 110 meet to form a corner and neighboring areas thereof.

The second frame 130 can include a plurality of protrusions 112 extending outwardly from the upper side 126. Each protrusion 112 can culminate in an outer tip surface 113. The protrusions 112 can have any suitable conformation. In one embodiment, the protrusions 112 can be substantially circular in cross-sectional shape, but other conformations are possible, including, for example, substantially rectangular, oval, triangular, polygonal and trapezoidal. The cross-sectional size of the protrusions 112 can be substantially constant or it can vary along the length of the protrusion 112. The protrusions 112 can extend from the upper side 126 of the second frame 130 at any suitable angle. In one embodiment, the protrusions 112 can be substantially orthogonal to the upper side 126 of the second frame 130.

The protrusions 112 can be relatively large and simple structures, as they must be able to withstand the compressive forces that they will be subject to in the battery assembly. Thus, it is preferred if the protrusions 112 do not include small and fine features, such as a plurality of thin walls or a double-wall, because such features may not withstand exposure to compressive forces in the final assembly, in addition to being more expensive and difficult to manufacture.

The plurality of protrusions 112 can be substantially identical to each other, or at least one of the protrusions 112 can be different from the other protrusions 112 in one or more respects including any of those described herein. The holes 116 and the protrusions 112 can be sized such that each protrusion 112 can be received in a respective one of the holes 116. In one embodiment, the holes 116 and the protrusions 112 can be sized such that each protrusion 112 can be received in a respective one of the holes 116 with a snug fit therebetween.

There can be any suitable quantity of protrusions 112. In one embodiment, there can be four protrusions 112 on the second frame 130. However, there may be greater or fewer protrusions 112 on the second frame 130. The quantity of protrusions 112 provided in the second frame 130 can be equal to the quantity of holes 116 provided in the first frame 110. The protrusions 112 can be arranged in any suitable manner. Generally, the protrusions 112 can be arranged on the upper side 126 of the second frame 130 such that each protrusion 112 is substantially aligned with a respective one of the holes 116 in the first frame 110. In one embodiment, there can be at least one protrusion 112 in each corner region 143 of the second frame 130. The corner region 143 includes the area where two portions of the second frame 130 meet to form a corner and neighboring areas thereof.

A plurality of holes 114 can extend through the thickness of the second frame 130 and the protrusion 112, from the lower side 128 to the outer tip surface 113 of each protrusion 112. The holes 114 can have any suitable conformation. In one embodiment, the holes 114 can be substantially circular in cross-sectional shape, but other cross-sectional shapes are possible, including, for example, substantially rectangular, oval, triangular, polygonal and trapezoidal. The cross-sectional size of the holes 114 can be substantially constant or it can vary along the length of the holes 114. The plurality holes 114 can be substantially identical to each other, or at least one of the holes 114 can be different from the other holes 114 in one or more respects including any of those described herein. The holes 114 can be sized and shaped to receive an elongated fastener, such as a tie rod, therein.

The height of each of the protrusion 112, as measured from the upper side 126 to the outer tip surface 113, can be configured relative to the depth of a corresponding hole 116 into which the protrusion 112 fits. In one embodiment, the outer tip surface 113 of the protrusion 112 can be substantially flush with the upper side 122 of the first frame 110. In another embodiment, the outer tip surface 113 of the protrusion 112 can be recessed from the upper side 122 of the first frame 110. In still another embodiment, the outer tip surface 113 of the protrusion 112 can project outwardly beyond the upper side 122 of the first frame 110. Additional details of such a possible configuration will be described below.

There may be more than one hole 116 and/or protrusion 112 in at least one of the corner regions 142 of the first and second frames 110, 130. For example, as is shown in FIG. 1, each corner region 142 of the first frame 110 can include a hole 116 and a protrusion 112', and each corner region 143 of the second frame can include a corresponding protrusion 112 as well as a hole 116'. In such case, each protrusion 112' in the first frame 110 can be received in a respective hole (not shown) in an adjacent second frame (not shown). Similarly, each hole 116' in the second frame 130 can receive a respective protrusion (not shown) from an adjacent first frame (not shown). In this way each sub-assembly 100 can be interconnected with neighboring sub-assemblies 100. The above discussion of the holes 116 and the protrusions 112 applies equally to the protrusions 112' and holes 116'.

It is noted that embodiments are not limited to the particular arrangement of holes 116 and protrusions 112 shown in FIG. 1. For example, the quantity and the location of the holes 116 can vary depending on, for example, the size, quantity, and/or the shape of the cells to be assembled. Further, one or more of the corner regions 142, 143 of each frame 110, 130 may include only protrusions 112 or only holes 116. Other suitable arrangements can include only one hole 116 or only one protrusion 112 at one or more of the corner regions 142 of the frames 110, 130. Alternatively or in addition, different corner regions 142, 143 can have different quantities of holes 116 and/or protrusions 112. Further, embodiments are not limited to the protrusions 112 and holes 116 being provided in the corner regions 142, 143 of the frames 110, 130. Indeed, in some embodiment, there may be no protrusions 112 and frames 116 provided in any of the corner regions 142, 143.

It should be noted that, in some instances, that one or more protrusions (not shown) can extend from the lower side 124 of the first frame 110. Each of such protrusions can be received into a respective hole (not shown) in the second frame 130. Such a configuration can be provided as an alternative or in combination to the protrusion/hole configurations described above. Further, the above discussion of the protrusions 112 and holes 116 can apply equally here.

The first frame 110 and the second frame 130 can be brought together about the heat sink 120 such that the protrusions 112 of the second frame 130 are received in the holes 116 in the first frame 110. In this way, the holes 116 and protrusions 112 can act as alignment guides or locators to facilitate assembly. The holes 116 and protrusions 112 can also minimize lateral movement of the first and second frames 110, 130 relative to each other.

Figure 2:
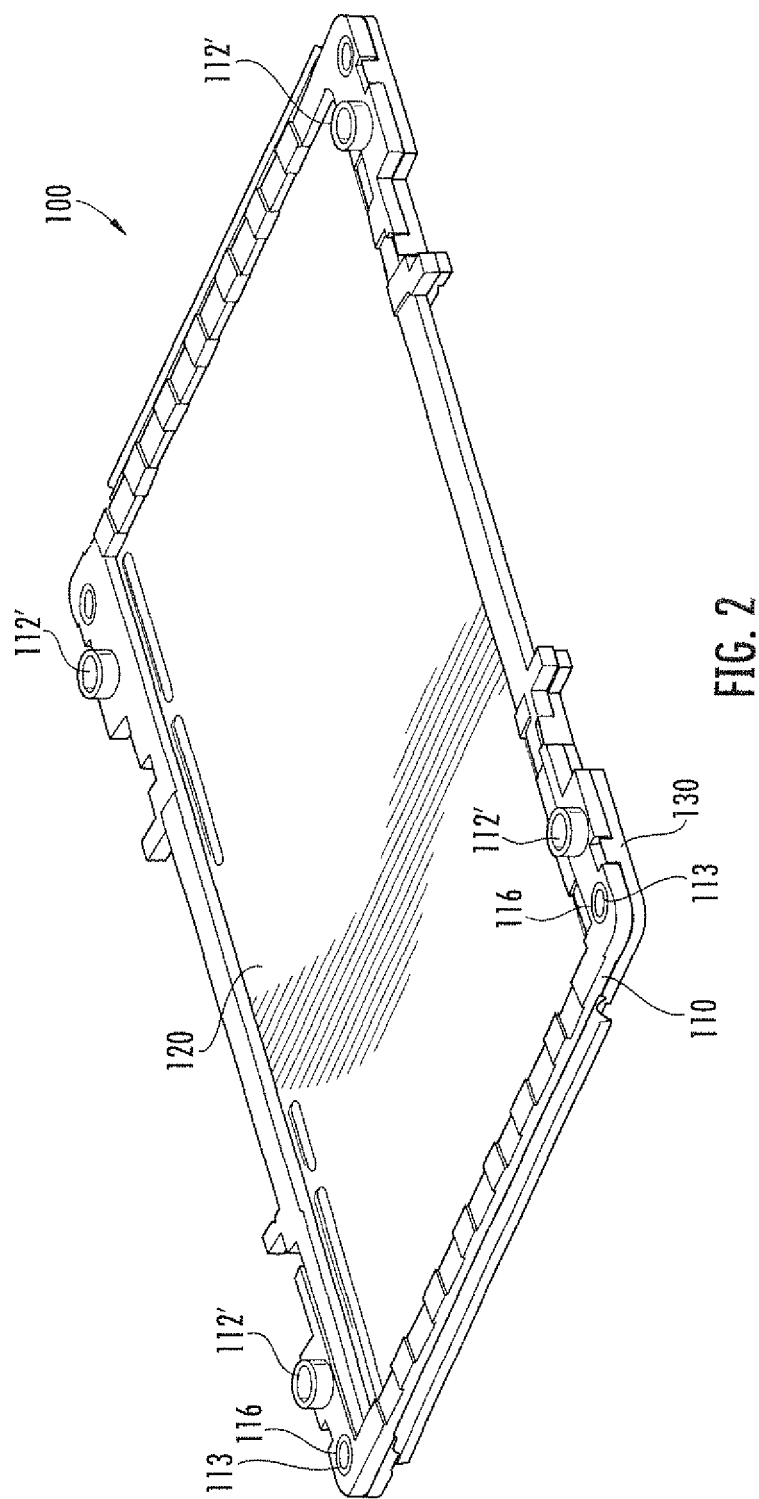
FIG. 2 is a perspective view of the sub-assembly of FIG. 1 in an assembled state.

The heat sink 120 can be held in place by engagement with the first and second frames 110, 130, generally along a perimeter region of the heat sink 120. As a result, a sub-assembly 100 is formed, as is shown in FIG. 2. A plurality of such assemblies 100 can be stacked to together. Adjacent sub-assemblies 100 can collectively form a cell pocket 140 (see FIG. 5). A cell pocket 140 can be formed on each side of the heat sink 120 of each sub-assembly 100. A battery cell 150, such as a lithium-ion battery cell, can be received in the pocket 140. The heat sink 120 can provide a surface on which a battery cell 150 (see FIG. 5) can be supported.

Figure 3:
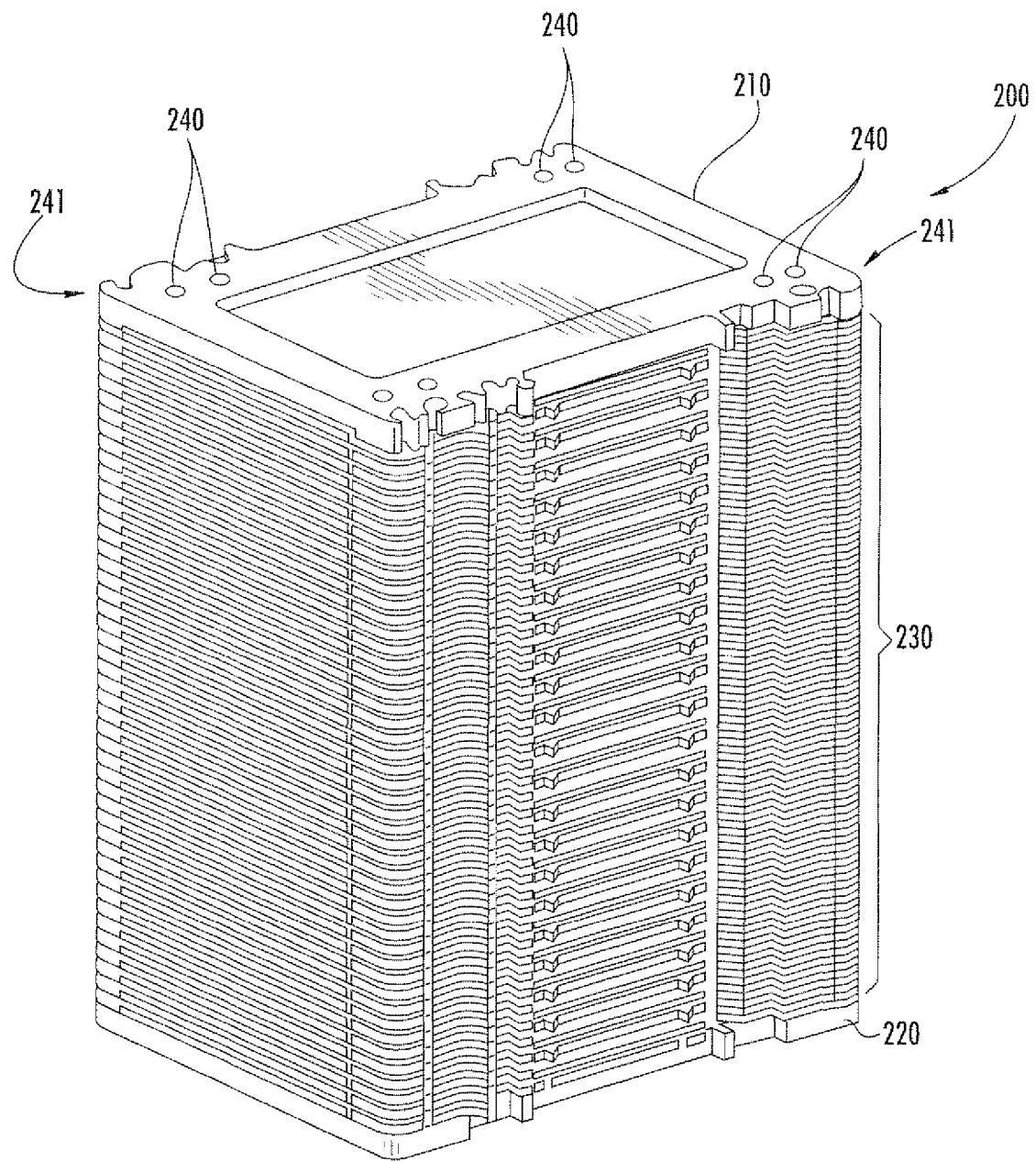
FIG. 3 is a perspective view of an exemplary battery cell assembly.

Referring to FIG. 3, an exemplary battery cell assembly 200 is shown. By alternatively stacking sub-assemblies 100 and battery cells 150 (see FIG. 5) on one another, a battery cell stack 230 can be formed. The battery cell stack 230 can then be assembled into a battery cell assembly 200, as shown in FIG. 3, by sandwiching the cell stack 230 between two end plates 210, 220. Elongated fasteners, such as tie rods 240, can be used to fix the cell stack 230 and the end plates 210 and 220 together. The quantity of tie rods 240 used can depend on a number of considerations, including, for example, the number of cells to be assembled, the required stability and/or available space. In the exemplary arrangement shown in FIG. 3, two tie rods 240 are used at each corner region 241 of the assembly 200. However, other suitable arrangements may also be used and embodiments are not limited to the particular arrangement shown. In one embodiment, there can be the same number of tie rods 240 used at each corner region 241 of the assembly; however, one or more of the corner regions 241 may have a different quantity of tie rods relative to the other corner regions 241.

Figure 4:
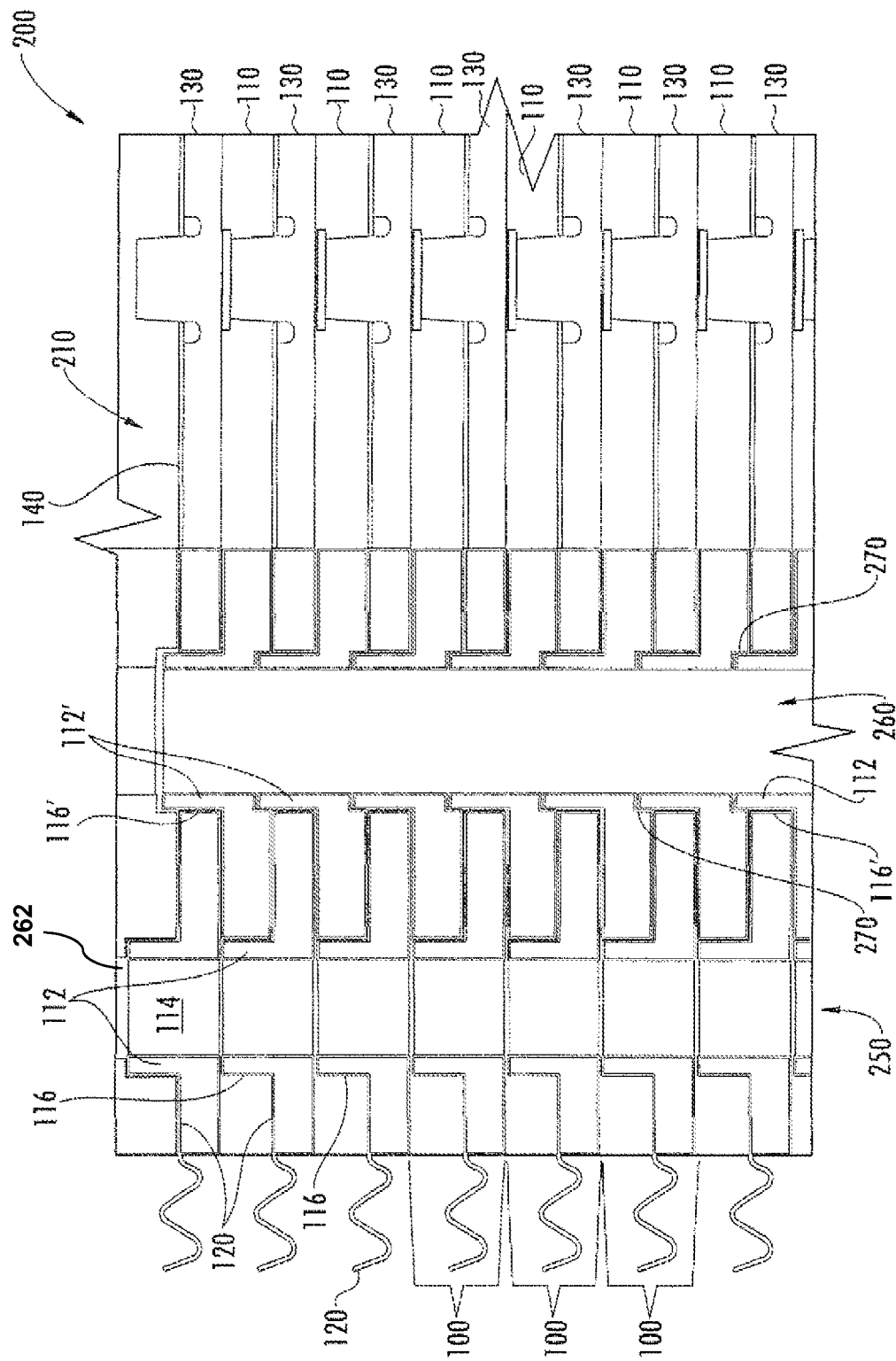
FIG. 4 is a side elevation cross-sectional view of the battery cell assembly, showing frames with interconnecting features.

An example of the interconnecting arrangement of the frames 110, 130 can be seen in FIG. 4. The battery cell assembly 200 includes a plurality of sub-assemblies 100 stacked together and sandwiched between two end plates 210, 220 (only end plate 210 is shown in FIG. 4). At least a portion of each of the protrusions 112 formed on the lower frames 130 can be received in a respective one of the through holes 116 formed in the adjacent upper frame 110 such that each protrusion is nested therein. In one embodiment, the protrusions 112 can fit snuggly fit into corresponding through holes 116 formed in adjacent upper frames 110. The nested protrusions 112 and through holes 116 can collectively form a continuous passage 250 for receiving a tie rod 240 (see FIG. 3). Similarly, the protrusions 112' formed on the upper frames 110 can snuggly fit into corresponding through holes 116 formed in adjacent lower frames 130 to form another continuous passage 260 for another tie rod 240 (see FIG. 3) to extend through. The tie rods 240 can extend longitudinally through the stack 230 with the tie rods 240 passing through the holes 114.

It will be appreciated that one or both of the end plates 210, 220 can include any suitable features to allow passage of the tie rods 240 and to accommodate any features of the adjacent frames 110 or 130 in the stack 230. For instance, one or both of the end plates 210, 220 can include recess 260 to accommodate the protrusion 112 in a neighboring frame 110 or 130, as shown in FIG. 4. In addition, the end plate 210 can include an aperture 262 to allow insertion of a tie rod. The tie rods are not shown in FIG. 4 in order to more clearly show the interlocking arrangement.

In another possible arrangement, a recess is provided in a side of one of the frames with a protrusion on the opposite side of the frame. For instance, FIG. 4 shows a recess 270 provided in the lower side 124 of the first frame 110. The recess 270 can extend to any suitable depth in the first frame 110. The recess 270 can be sized and shaped to receive a protrusion 112. For instance, the protrusion 112 on the upper side 122 of the first frame 110 can have a height that is greater than the depth of a corresponding through hole 116' of the second frame 130 into which the protrusion 112 is received. As a result, the protrusion 112 can extend beyond the upper side 126 of the second frame 130 and into the recess 270 provided in the lower side 124 of the first frame 110 of an adjacent one of the sub-assemblies. In this way, even greater interconnection between the frames can be achieved and a greater degree of isolation of the tie rod or other fastener can be provided. While the embodiment in FIG. 4 shows the recess 270 as being provided in the lower side 124 of the first frame 110, it will be appreciated that the recess 270 can be provided in the upper side 122 of the first frame 110, the lower side 128 of the second frame 130 and/or the upper side 126 of the second frame 130. Corresponding protrusions 112 can be provided as appropriate.

FIG. 5 is another partial sectional view of the battery cell assembly 200, showing cell pockets 140, each formed between two adjacent sub-assemblies 100. A battery cell 150 can be accommodated in each cell pocket 140 and supported by the heat sink 120. The battery cell 150 can have lateral portions 151, which can be the battery contacts, that are sandwiched between the first and second frames 110, 130. Embodiments of systems herein can be used in connection with any type of battery cells, including lithium-ion battery cells. Embodiments are particularly suitable for assembling prismatic cells which are normally difficult to package into a larger grouping of cells.

The interconnected arrangement described herein can provide the battery cell assembly 200 with stability and rigidity because the protrusions prevent the adjacent frames from moving laterally relative to one another. The stability and rigidity can be further improved by providing pairs of fasteners in each corner region. Due to the improved stability and rigidity, the battery cell assembly 200 can include a greater number of cells, if desired, than was available in previous cell assemblies. The nested arrangement of the protrusions 112 and the holes 116 can also prevent the cells 150 from contacting the tie rods 240, thus preventing a short and also improving safety of the battery. Further, the protrusions 112 and the holes 116 can also facilitate alignment of the frames during assembly.

The foregoing description is provided in the context of one possible application for a battery cell assembly. Thus, it will of course be understood that embodiments are not limited to the specific details described herein, which are given by way of example only, and that various modifications and alterations are possible within the scope of the following claims.

What is claimed is:

1. A battery assembly comprising:
   a plurality of sub-assemblies, each of the sub-assemblies including
      a cell support,
      a first frame, and
      a second frame,
         the first frame including an upper side and a lower side, a plurality of holes extending through the first frame from the upper side to the lower side,
         the second frame including an upper side and a lower side, a plurality of protrusions extending from the upper side thereof to an outer tip surface, a plurality of holes extending through the second frame from the lower side to a respective one of the outer tip surfaces, each of the plurality of protrusions including a solid wall portion surrounding the respective hole,
         the first and second frames being disposed on opposite sides of the cell support such that at least a portion of the cell support is sandwiched between the lower side of the first frame and the upper side of the second frame and such that the solid wall portion of each of the protrusions is at least partially received in a respective one of the holes in the first frame, whereby the first and second frames are interlockingly engaged, the plurality of sub-assemblies being stacked to form a plurality of cell pockets, each cell pocket being formed between two adjacent sub-assemblies; and a plurality of elongated fasteners, wherein the plurality of holes in the second frame of each of the sub-assemblies are substantially aligned to collectively form a plurality of passages for receiving the plurality of elongated fasteners therein to fix the plurality of sub-assemblies together.

2. The assembly of claim 1 further including a plurality of battery cells, wherein each battery cell is received in a respective one of the plurality of cell pockets and wherein portions of each battery cell are sandwiched between adjacent sub-assemblies.

3. The assembly of claim 2 wherein the battery cells are lithium-ion battery cells.

4. The assembly claim 1 further including two end plates, the end plates being disposed on opposite ends of the plurality of sub-assemblies such that the plurality of sub-assemblies are sandwiched between the two end plates.

5. The assembly of claim 1 wherein the first and second frames have a substantially rectangular shape and an open middle portion.

6. The assembly of claim 5 wherein the frames have a plurality of corner regions, wherein each hole in the first frame is located in a corner region thereof, and wherein each protrusion of the second frame is located in a corner region thereof.

7. The assembly of claim 5 wherein each of the first frames includes a protrusion for being received into a hole in the second frame of an adjacent one of the plurality of sub-assemblies, wherein the protrusion extends from the upper side of each of the first frames to an outer tip surface, wherein a hole extends through the first frame from the lower side to the outer tip surface, wherein the protrusion is located in one of the corner regions of the first frame.

8. The assembly of claim 1 wherein the cell support is a heat sink.

9. The assembly of claim 1 wherein at least one of the protrusions has a substantially circular cross-sectional shape.

10. The assembly of claim 1 wherein each protrusion has an associated height, wherein the height of each protrusion is less than or equal to the depth of a corresponding through hole into which the protrusion is received.

11. The assembly of claim 1 wherein, in a first one of the sub-assemblies, the height of at least one of the protrusions of the second frame is greater than the depth of a corresponding through hole into which the protrusion is received such that the at least one of the protrusions extends beyond the upper side of the first frame and into a recess provided in the lower side of the second frame of an adjacent second one of the sub-assemblies.

12. The assembly of claim 1 wherein the elongated fasteners are tie rods.

13. The battery assembly of claim 1, wherein the solid wall portion of each of the plurality of protrusions of the second frame is a contiguous wall surrounding the respective hole extending from the lower side of the second frame to the respective outer tip surface of the second frame.

14. The assembly of claim 1, wherein the first frame of each of the plurality of sub-assemblies includes a protrusion extending from the upper side of the first frame, the protrusion of the first frame aligned with one of the plurality of holes extending through the second frame when adjacent ones of the plurality of sub-assemblies are assembled to one another, such that the protrusion of the first frame cooperates with the corresponding hole of the second frame to interlockingly engage adjacent pairs of the sub-assemblies.

15. The assembly of claim 1, wherein the protrusions of the second frame each define a protrusion height that is at least equal to a corresponding depth of the hole of the first frame into which the protrusion is received.

16. A battery assembly comprising:
a plurality of sub-assemblies, each of the sub-assemblies including
a cell support,
a first frame and
a second frame,
the first frame including an upper side and a lower side, a plurality of holes extending through the first frame from the upper side to the lower side,
the second frame including an upper side and a lower side, a plurality of protrusions extending from the upper side thereof to an outer tip surface, a plurality of holes extending through the second frame from the lower side to a respective one of the outer tip surfaces,
the first and second frames being disposed on opposite sides of the cell support such that at least a portion of the cell support is sandwiched between the lower side of the first frame and the upper side of the second frame and such that each of the protrusions is at least partially received in a respective one of the holes in the first frame, whereby the first and second frames are interlockingly engaged,
the plurality of sub-assemblies being stacked to form a plurality of cell pockets, each cell pocket being formed between two adjacent sub-assemblies,
the holes in the second frame of each of the sub-assemblies being substantially aligned so as to collectively form a plurality of passages;
a plurality of battery cells, wherein each battery cell is received in a respective one of the plurality of cell pockets and wherein portions of each battery cell are sandwiched between adjacent sub-assemblies; and
a plurality of elongated fasteners, each elongated fastener being received in a respective one of the passages, whereby the plurality of elongated fasteners fix the plurality of sub-assemblies together,
wherein the nested arrangement of the respective protrusions of the second frame and the respective hole of the first frame of each of the plurality of sub-assemblies provides a physical barrier between the cell pockets and the elongated fasteners.

17. The assembly of claim 16 wherein the elongated fasteners are tie rods.

18. The assembly of claim 16 wherein the cell support is a heat sink.

19. The battery assembly of claim 16, wherein the plurality of protrusions of the second frame completely surround the plurality of holes of the second frame.

20. The assembly of claim 16, wherein the first frame of each of the plurality of sub-assemblies includes a protrusion extending from the upper side of the first frame, the protrusion of the first frame aligned with one of the plurality of holes extending through the second frame when adjacent ones of the plurality of sub-assemblies are assembled to one another, such that the protrusion of the first frame cooperates with the corresponding hole of the second frame to interlockingly engage adjacent pairs of the sub-assemblies.

21. A battery assembly comprising:
a plurality of sub-assemblies, each of the sub-assemblies including
a first frame and
a second frame,
the first frame including an upper side and a lower side, a plurality of holes extending through the first frame from the upper side to the lower side,
the second frame including an upper side and a lower side, a plurality of protrusions extending from the upper side thereof to an outer tip surface, a plurality of holes extending through the second frame from the lower side to a respective one of the outer tip surfaces, each of the protrusions being at least partially received in a respective one of the holes in the first frame,
a plurality of battery cells,
the plurality of sub-assemblies being alternatingly stacked with the plurality of battery cells such that portions of each battery cell are sandwiched between adjacent sub-assemblies,
the holes in the second frame of each of the sub-assemblies being substantially aligned so as to collectively form a plurality of passages; and
a plurality of elongated fasteners, each elongated fastener being received in a respective one of the passages, whereby the plurality of elongated fasteners fix the plurality of sub-assemblies together,
wherein the nested arrangement of the respective protrusions of the second frame and the respective hole of the first frame of each of the plurality of sub-assemblies provides a physical barrier between the cell pockets and the elongated fasteners.

22. The assembly of claim 21 wherein the elongated fasteners are tie rods.

23. The assembly of claim 21 wherein, in a first one of the sub-assemblies, the height of at least one of the protrusions of the second frame is greater than the depth of a corresponding through hole in the first frame into which the protrusion is received such that the at least one of the protrusions extends beyond the upper side of the first frame and into a recess provided in the lower side of the second frame of an adjacent second one of the sub-assemblies.

24. The assembly of claim 21 wherein each protrusion has an associated height, wherein the height of each protrusion is less than or equal to the depth of a corresponding through hole into which the protrusion is received.

25. The battery assembly of claim 21, wherein the plurality of protrusions of the second frame completely surround the plurality of holes of the second frame.

26. The assembly of claim 21, wherein the first frame of each of the plurality of sub-assemblies includes a protrusion extending from the upper side of the first frame, the protrusion of the first frame aligned with one of the plurality of holes extending through the second frame when adjacent ones of the plurality of sub-assemblies are alternatingly stacked, such that the protrusion of the first frame cooperates with the corresponding hole of the second frame to interlockingly engage adjacent pairs of the sub-assemblies.

27. The assembly of claim 21, wherein the protrusions of the second frame each define a protrusion height that is at least equal to a corresponding depth of the hole of the first frame into which the protrusion is received.

28. A battery assembly comprising:
a first frame including an upper side and a lower side and an open middle portion extending from the lower side to the upper side, a plurality of holes extending through the first frame from the lower side to the upper side; and
a second frame including an upper side and a lower side and an open middle portion extending from the lower side to the upper side, a plurality of protrusions extending from the upper side of the second frame and a plurality of holes extending completely through respective protrusions down to the lower side of the second frame, the second frame being positioned relative to the first frame such that the plurality of protrusion of the second frame are received in the plurality of holes of the first frame thereby forming a plurality of passages through the first frame and the second frame, the middle portion of the first frame and the middle portion of the second frame cooperating to form a battery cell pocket;
a battery cell generally disposed in the battery cell pocket; and
a plurality of elongated fasteners which are received in respective passages of the plurality of passages, the plurality of holes of the first frame and the plurality of protrusions of the second frame cooperating to form a physical barrier between the battery cell and the plurality of elongated fasteners, the plurality of elongated fasteners coupling the first frame and the second frame together.

29. The assembly of claim 28, wherein:
the first frame and the second frame cooperate to form a sub-assembly, the battery assembly comprising a plurality of the sub-assemblies;
the first frame includes a protrusion extending from the upper side of the first frame;
the second frame includes a hole extending from the upper side to the lower side thereof; and
the protrusion of the first frame is aligned with one of the plurality of holes extending through the second frame when the first frame is positioned relative to the second frame to form the battery cell pocket,
the protrusion of the first frame cooperating with the corresponding hole of the second frame to interlockingly engage adjacent pairs of the sub-assemblies.

30. The assembly of claim 28, wherein the protrusions of the second frame each define a protrusion height that is at least equal to a corresponding depth of the hole of the first frame into which the protrusion is received.

* * * * *